(12) United States Patent
Kamiyama et al.

(10) Patent No.: US 7,165,578 B2
(45) Date of Patent: Jan. 23, 2007

(54) METHOD FOR LAYING A REHABILITATING PIPE

(75) Inventors: Takao Kamiyama, Hiratsuka (JP); Koji Kaneta, Hiratsuka (JP); Kenji Fujii, Hiratsuka (JP); Takeshi Hasegawa, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 218 days.

(21) Appl. No.: 11/048,961

(22) Filed: Feb. 2, 2005

(65) Prior Publication Data

US 2005/0236059 A1 Oct. 27, 2005

(30) Foreign Application Priority Data

Apr. 22, 2004 (JP) ............................. 2004-126209

(51) Int. Cl.
 *F16L 55/16* (2006.01)
(52) U.S. Cl. ......................................... 138/98; 405/151
(58) Field of Classification Search .................. 138/97, 138/98, 155, 174, 175; 405/150.1, 150.2, 405/151–153
See application file for complete search history.

(56) References Cited

U.S. PATENT DOCUMENTS

| | | | | |
|---|---|---|---|---|
| 1,500,306 A | * | 7/1924 | Forward et al. ............ 138/108 |
| 2,738,995 A | * | 3/1956 | Risley et al. ............... 285/342 |
| 4,295,501 A | * | 10/1981 | Tolliver ..................... 140/92.1 |
| 4,397,583 A | * | 8/1983 | Horncy et al. ........... 405/150.1 |
| 4,441,527 A | * | 4/1984 | Tolliver ...................... 138/175 |
| 4,467,995 A | * | 8/1984 | Tolliver ...................... 249/160 |
| 4,799,824 A | * | 1/1989 | Kumai et al. ............... 405/146 |
| 4,813,813 A | * | 3/1989 | Yamamoto et al. ......... 405/146 |
| 5,186,217 A | * | 2/1993 | Kallinich et al. ........... 138/149 |
| 6,468,000 B2 | * | 10/2002 | McNally et al. ......... 405/150.1 |
| 2003/0136455 A1 | * | 7/2003 | Kamiyama et al. ........... 138/98 |
| 2004/0108009 A1 | * | 6/2004 | Kamiyama et al. ........... 138/97 |

* cited by examiner

*Primary Examiner*—James Hook
(74) *Attorney, Agent, or Firm*—Adams & Wilks

(57) ABSTRACT

A rehabilitating pipe is laid inside an existing pipe to rehabilitate the existing pipe. Support members are integrally connected to an inner wall surface of the existing pipe so that loop portions of the respective support members extend from the inner wall surface of the existing pipe. The rehabilitating pipe is assembled inside of the existing pipe by mutually coupling segments of the rehabilitating pipe in a longitudinal direction of the existing pipe by inserting coupling members through connecting through-holes of the segments and through the loop portions of the respective support members to thereby support the assembled rehabilitating pipe so that the rehabilitating pipe remains inside of the existing pipe after assembly to rehabilitate the existing pipe.

20 Claims, 7 Drawing Sheets

METHOD FOR LAYING A REHABILITATING PIPE

BACKGROUND OF THE INVENTION

1. Field of the Invention

The present invention relates to a method for laying a rehabilitating pipe wherein a rehabilitating pipe is laid inside an existing pipe such as a sewer pipe to rehabilitate the existing pipe.

2. Description of the Prior Art

A method of rehabilitating an existing pipe is known, for example, from Japanese Patent Laid Open Publication No. 2003-286742 in which an existing pipe such as a sewer pipe is rehabilitated using a rehabilitating pipe whose outer diameter is slightly less than the inner diameter of the existing pipe. A filler is filled and hardened in a gap between the outer periphery of the rehabilitating pipe and the inner wall surface of the existing pipe to construct a compound pipe comprising the rehabilitating pipe, the filler, and the existing pipe. The rehabilitating pipe is assembled by coupling segments in the circumferential direction and the longitudinal direction of the pipe. One segment corresponds to a block shaped member obtained by segmenting the rehabilitating pipe in its circumferential and longitudinal directions of the pipe.

Due to its own weight and the weight of the filler filled after assembly, the assembled rehabilitating pipe unfortunately deforms into a distorted shape so that it breaks in the downward direction if left as is. Conventionally, various methods have been employed as countermeasures, such as to increase the thickness and strength of the segments; to accessorily provide steel reinforcing rods in a ring shape around the outer periphery of the rehabilitating pipe; and, before filling with the filler, to install inside the rehabilitating pipe supports, such as struts, at intervals of several meters in the longitudinal direction.

In addition, at a position where the outer periphery of the lower end of the rehabilitating pipe contacts the bottom of the existing pipe, it is necessary to position the center of the rehabilitating pipe so that it is directly below the center of the existing pipe; however, because the specific gravity of the rehabilitating pipe is less than that of the filler, the rehabilitating pipe unfortunately floats above the aforementioned position if left as is. To avoid this, spacers are conventionally inserted from the left and right of the rehabilitating pipe between the outer periphery of the upper side of the rehabilitating pipe and the inner wall surface of the existing pipe, and pressed so that the rehabilitating pipe does not float upwards, thus positioning the rehabilitating pipe at the aforementioned position.

If the segments are made thicker, then there is a problem in that the weight of the segments increase, thus increasing the burden on the workers performing the assembly of the rehabilitating pipe; in addition, the amount of resin filled in the segments also increases, thus unfortunately leading to a cost increase. In addition, there is a problem in that the work involved in the method of accessorily providing steel reinforcing rods in a ring shape is extremely troublesome and time consuming. In addition, there is also a problem in that, in the method of installing the supports, the supports hinder the workers who move inside the narrow rehabilitating pipe when performing the work of filling with the filler, thus degrading working efficiency; in addition, it is necessary to perform the work of removing the supports after hardening of the filler. In addition, the deformation of the rehabilitating pipe cannot be prevented just with the method that presses down on the upward rise of the rehabilitating pipe with spacers, and it is consequently unfortunately necessary to also use, in parallel, one of the aforementioned methods of preventing deformation.

It is therefore an object of the present invention to provide a method for laying a rehabilitating pipe wherein the deformation and upward rising of the rehabilitating pipe can be prevented, and wherein the work of laying the rehabilitating pipe can be performed more simply and in a shorter period of time with the weight and cost of the segments reduced.

SUMMARY OF THE INVENTION

In a method for laying a rehabilitating pipe inside an existing pipe according to the present invention, segments are mutually coupled in the circumferential and longitudinal directions of the existing pipe to assemble the rehabilitating pipe. The method comprises the steps of fixing supporting members each having a hole to an inner wall surface of the existing pipe; and coupling the segments in the longitudinal direction of the existing pipe using a rod-shaped coupling member. The coupling member is inserted through the segment in the longitudinal direction and through the hole of the supporting member to thereby support the assembled rehabilitating pipe inside the existing pipe.

The method of the present invention can prevent deformation of the rehabilitating pipe due to its own weight and the weight of the filler, and can prevent the floating up of the rehabilitating pipe when filling with the filler because the rehabilitating pipe being assembled is supported during coupling of the segments in the longitudinal direction by the supporting members, which are previously fixed to the inner wall surface of the existing pipe. Accordingly, superior effects are obtained in that the thickness, weight, and cost of the segments are reduced; in addition, the work of laying the rehabilitating pipe can be performed more simply and in a shorter period of time because it suffices to just fix the supporting members to the inner wall surface of the existing pipe beforehand, and it is unnecessary to accessorily provide steel reinforcing rods for reinforcement or to install supports to prevent deformation.

Further features of the invention, its nature and various advantages will be more apparent from the accompanying drawings and following detailed description of the invention.

DETAILED DESCRIPTION OF THE PREFERRED EMBODIMENTS

Figure 1:
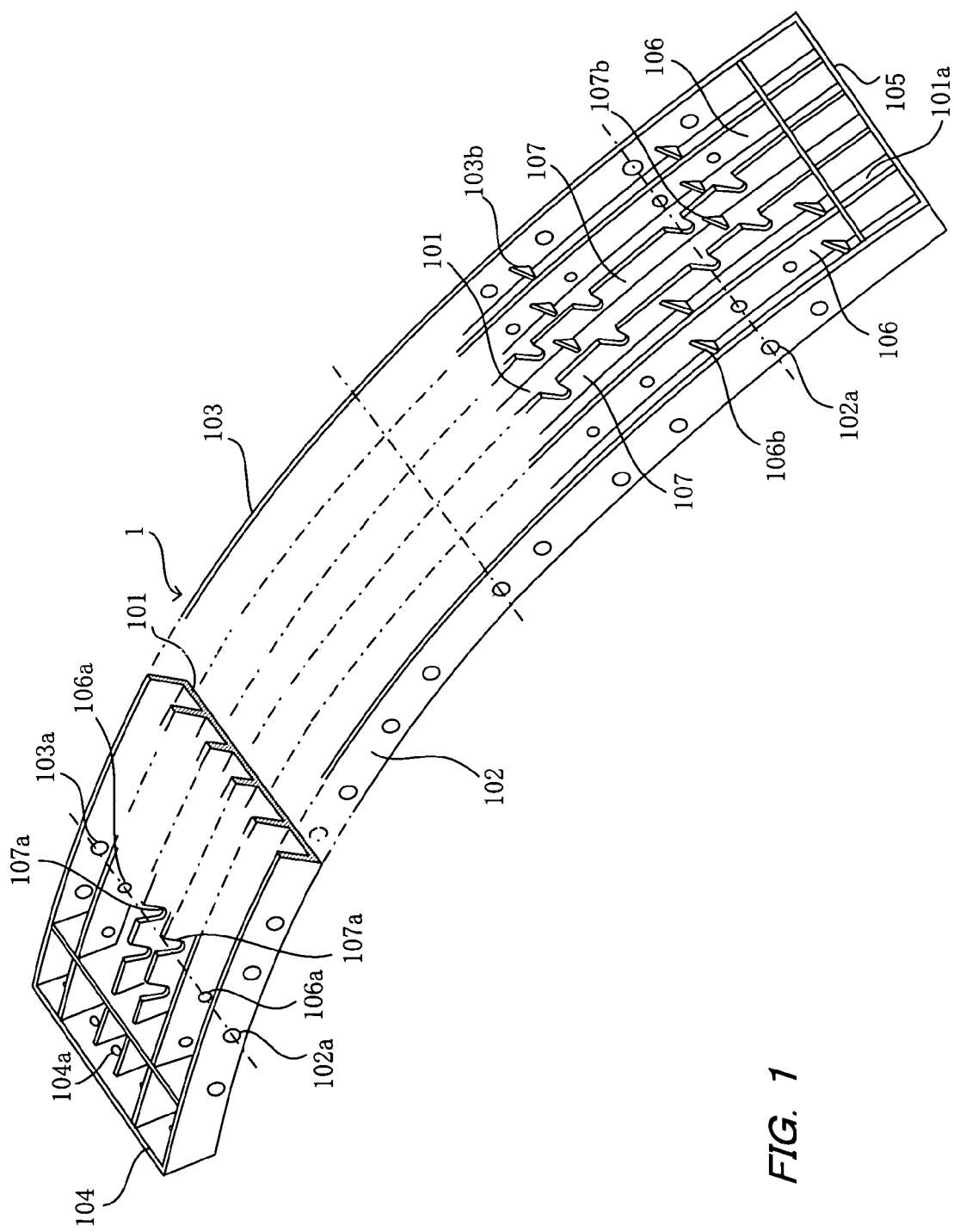
FIG. 1 is a perspective view showing a partially schematic section of a segment used in laying a rehabilitating pipe in an embodiment of the present invention.

The present invention will be described based on preferred embodiments, referring to the drawings in which a round rehabilitating pipe is shown whose cross sectional shape orthogonal to the longitudinal direction is round; however, it is understood that the method of the present invention can also be applied even to the laying of a rehabilitating pipe having another shape, such as a rectangle.

Figure 5:
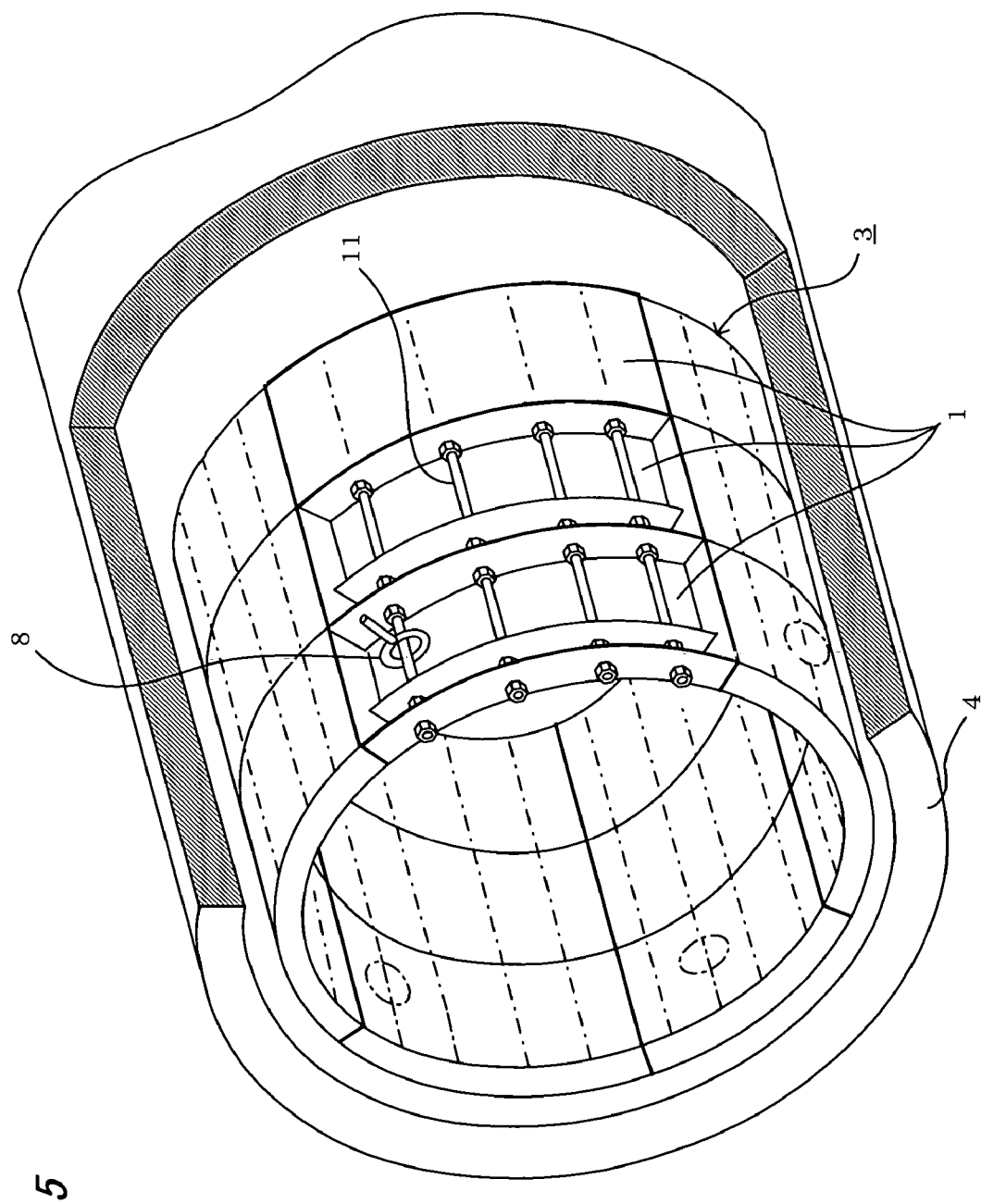
FIG. 5 is a partial broken perspective view showing how the segments are coupled inside the existing pipe to assemble a rehabilitating pipe.

An existing pipe 4 such as a round sewer pipe is rehabilitated using a rehabilitating pipe 3 whose outer diameter is a prescribed amount less than the inner diameter of the existing pipe 4, as shown in FIG. 5. The rehabilitating pipe 3 is laid inside the existing pipe 4 by coupling segments 1 in the circumferential and longitudinal directions of the existing pipe 4.

One segment 1 serves as an assembly unit for the rehabilitating pipe 3 and, as shown in FIG. 1, comprises an inner plate 101, side plates 102 and 103, end plates 104 and 105, and respectively two each of reinforcing plates 106 and 107. These plates 101 through 107 are integrally molded from a transparent, semitransparent, or opaque plastic to provide one segment. Vinyl chloride, ABS, DuraStar polymer (trade name), and the like are used as the transparent plastic. PVC, polyethylene, and the like are used as the semitransparent plastic. PVC, polyester, ABS, polyethylene, polypropylene, and the like are used as the opaque plastic.

The inner plate 101 is formed as a plate having a prescribed width and is arcuately curved at a prescribed angle that divides the circumference into a plurality of equal parts, e.g., 72° (five parts). The bottom surface of the inner plate 101 corresponds to the inner circumferential surface of the rehabilitating pipe with the circumferential direction of the arc corresponding to the circumferential direction of the rehabilitating pipe and the latitudinal direction of the arc to the longitudinal direction thereof. A plurality of rectangular openings 101a is formed respectively on both end parts of the inner plate 101 for performing from the inside the work to mutually couple the segments 1 in the circumferential direction.

The side plates 102 and 103 are formed at both side edges along the circumferential direction of the inner plate 101, and are provided upright outwardly at a prescribed height on the top surface of the inner plate 101. A plurality of connecting through holes 102a and 103a (herein, 14) (second connecting holes) is formed in each of the side plates 102 and 103 at a prescribed interval in the circumferential direction for passing therethrough coupling members in the longitudinal direction, as discussed later.

Figure 3:
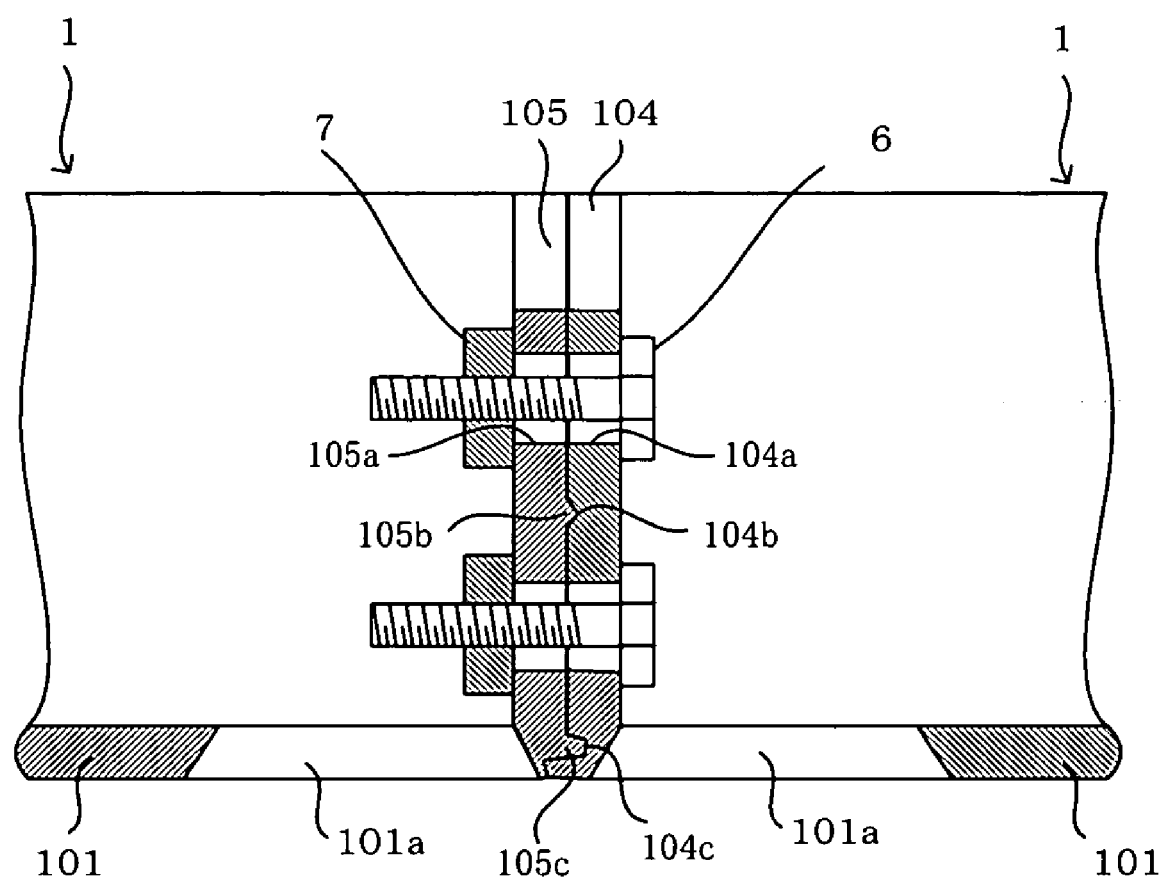
FIG. 3 is a longitudinal cross sectional view taken along the circumferential direction of the coupling members showing how the segments are mutually coupled in the circumferential direction.

The connecting plates 104 and 105 (hereinafter "end plates") are formed at both end edges of the inner plate 101 along the longitudinal direction thereof, and are provided upright outwardly on the top surface of the inner plate 101 at a height the same as each of the side plates. Through holes 104a and 105a (first connecting holes) are formed at a plurality of locations in the end plates 104 and 105 for passing therethrough bolts that mutually couple the segments 1 in the circumferential direction (refer also to FIG. 3).

The reinforcing plates 106 and 107 serve to reinforce the mechanical strength of the entire segment 1, and are provided upright outwardly at a prescribed height on the top surface of the inner plate 101 on the inner sides of the side plates 102 and 103. In the reinforcing plates 106 and 107 are formed a plurality of through holes 106a and notched parts 107a for inserting therethrough the coupling members in the longitudinal direction at a position respectively corresponding to the through holes 102a and 103a of the side plates 102 and 103.

In addition, laterally projecting, small, right triangular protruding plates 103b, 106b and 107b (the protruding plates of the side plate 102 are not shown) are formed at a plurality of locations on the inside surfaces of the side plates 102 and 103 and both side surfaces of the reinforcing plates 106 and 107 to prevent deformation respectively thereof, thereby forming a rib structure that enhances the strength of the segment 1.

When the existing pipe to be repaired is circular in cross sectional shape, the segment 1 corresponds to a block obtained when a circular pipe with outer and inner circumference curvatures respectively corresponding to that of the existing pipe is cut off in round slices at a prescribed width, and the thus sliced pipe is segmented in the circumferential direction for division into parts (preferably into equal parts).

The number of reinforcing plates or the number of protruding plates can be varied in accordance with the required strength of the segment; if strong, then some or all can be omitted. In addition, the segment functions as a rehabilitating or repairing unit, so that it is not limited to an arcuate type or fan type as shown in FIG. 1, and can be made as a parallelepiped in accordance with the cross sectional shape or size of the existing pipe or the repair location of the existing pipe, and can also be made as a shape bent into a rounded right angle.

The segments are successively coupled in the circumferential direction with the outer surfaces of every end plate of each segment mutually aligned and also the inner surfaces of every inner plate thereof mutually aligned. The segments are also successively coupled in the longitudinal direction so that the outer surfaces of every side plate of each segment are mutually aligned and the inner surfaces of each inner plate are mutually aligned. Thus processes allow a rehabilitating pipe to be assembled with the inner entire surface thereof being uniform without any gap between the segments.

The following explains the details of a method for laying a rehabilitating pipe inside an existing pipe using the segments.

Figure 6:
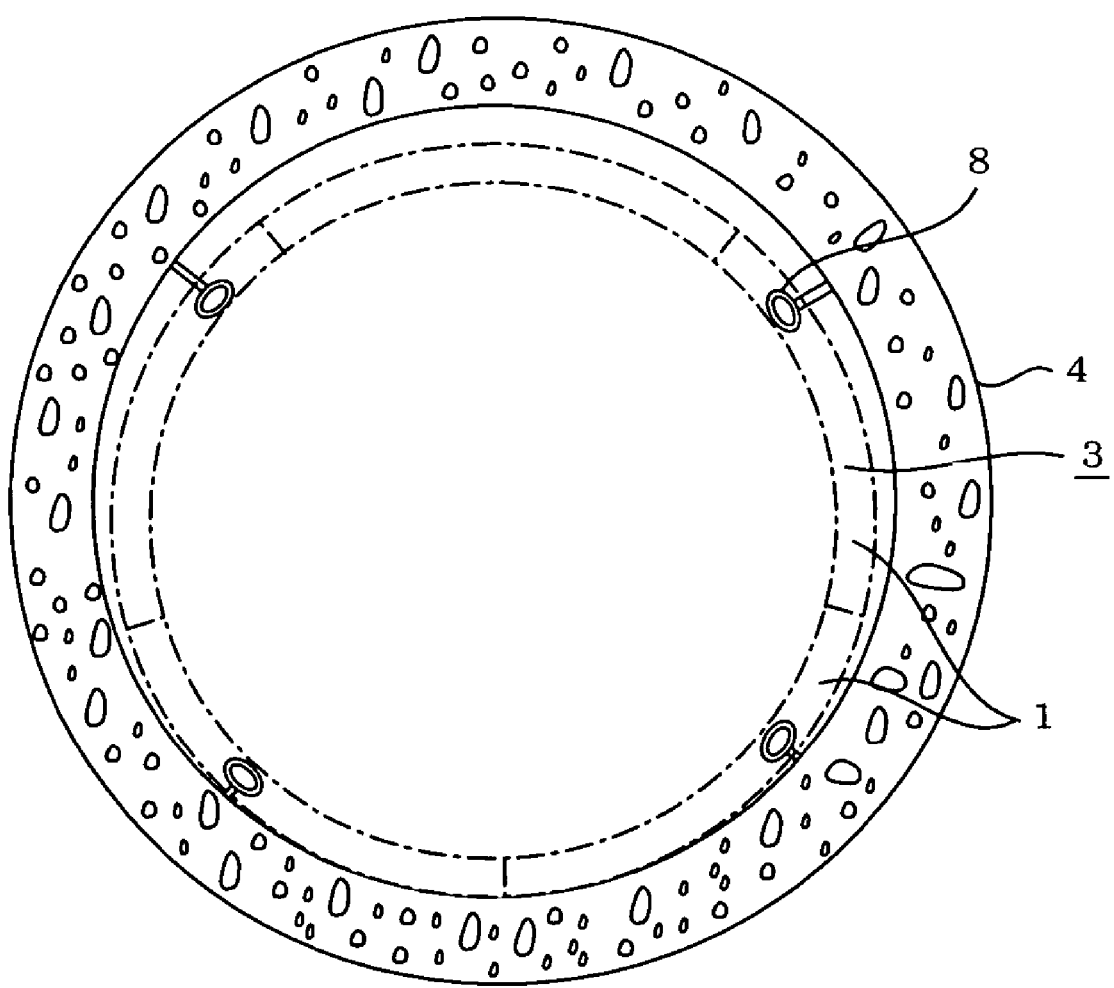
FIG. 6 is a cross sectional view orthogonal to the longitudinal direction showing how anchor rings are fixed to the inner wall surface of the existing pipe.
Figure 7:
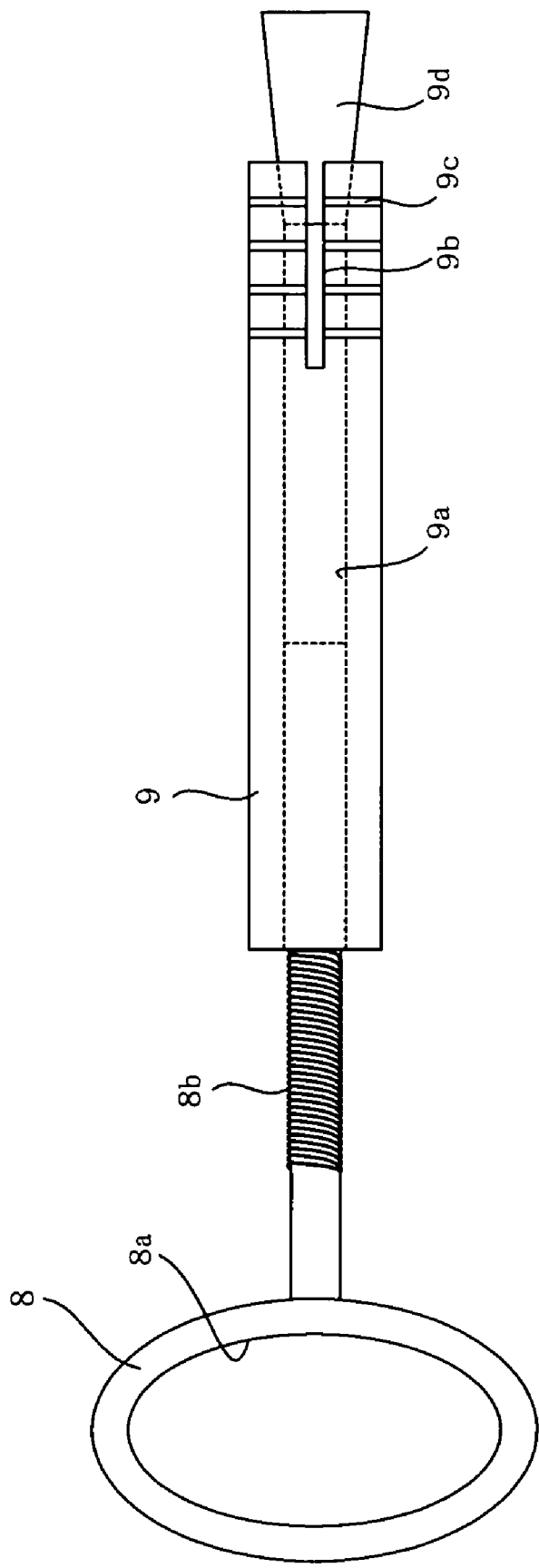
FIG. 7 is a planar view showing the structure of the anchor ring and the anchor bolt for fixing such.

First, before assembling the rehabilitating pipe, anchors are fixed to the inner wall surface of the existing pipe 4, as shown in FIG. 6. Each anchor serves as a support or supporting member that supports the rehabilitating pipe in order to prevent the deformation and floating up of the rehabilitating pipe. As shown in FIG. 7, the anchor comprises an end forming a closed loop portion, such as in the form of an anchor ring 8 having an elliptical hole 8a and a screw part 8b, and an anchor bolt 9 having a screw hole 9a, slits 9b and recessed parts 9a with a tapered member 9d inserted through the anchor bolt at the tip thereof. A hole is drilled in the inner wall surface of the exiting pipe 4 and the anchor bolt 9 is inserted and driven into the hole. As the tapered member 9d is pressed in, the structure of the slits 9b and recessed parts 9a allows the anchor bolt 9 to expand at the tip in the radial direction to jam into the hole. This allows the anchor bolt 9 to be fixed to the inner wall surface of the existing pipe 4. By screwing the screw part 8b of the anchor ring 8 into the screw hole 9a of the anchor bolt 9, the anchor ring 8 can also be fixed to the inner wall surface of the existing pipe 4.

The anchor rings 8 and anchor bolts 9 are fixed at a plurality of positions at an appropriate interval (for example, one to several meters) in the longitudinal direction on the inner wall surface across the length of the existing pipe 4 and are also fixed at a plurality of positions (herein, four positions, two each at the upper end and the lower end) at an appropriate angular interval in the circumferential direction of the existing pipe 4, as shown in FIG. 6.

Figure 4:
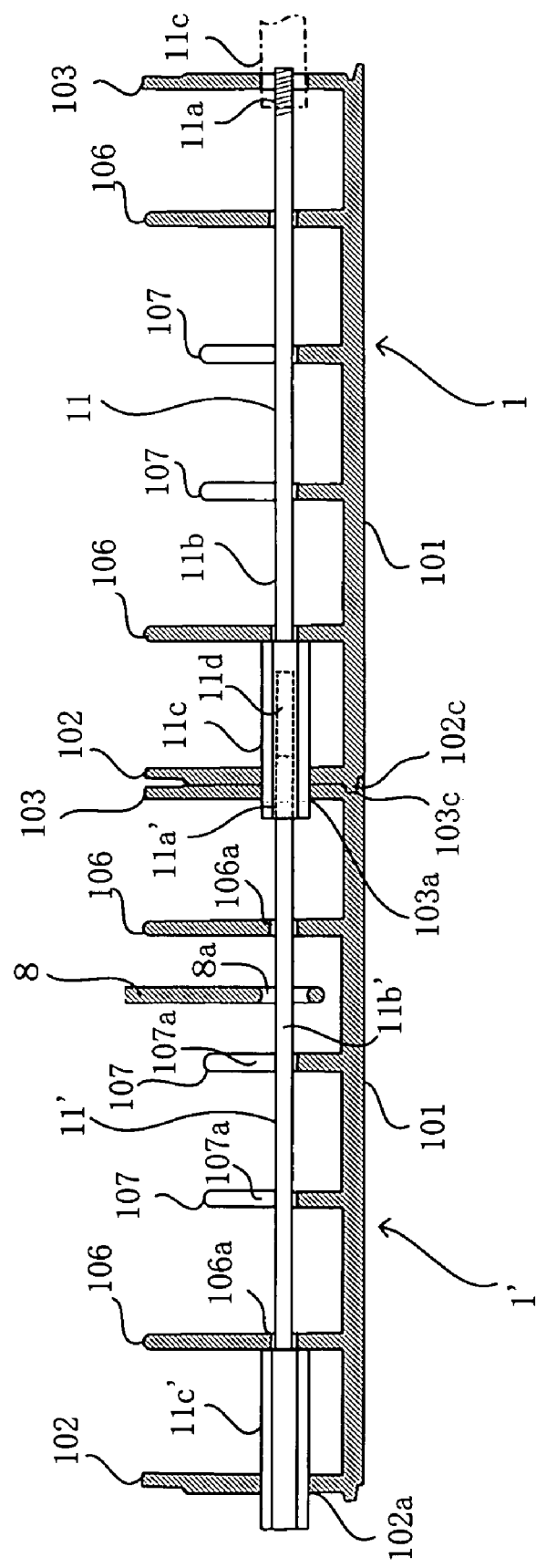
FIG. 4 is a radial cross sectional view taken along the longitudinal direction showing how the segments are mutually coupled by coupling members in the longitudinal direction.

The fixing positions of the anchor are selected such that a coupling member 11 for coupling the segments in the longitudinal direction can pass through the holes 8a of the anchor ring 8 (refer to FIG. 4). In addition, the anchor rings 8 are fixed so that the long axis direction of the ellipse of the hole 8a follows the circumferential direction of the existing pipe 4. In addition, by varying the extent to which the screw part 8b of the anchor ring 8 is screwed into the screw hole 9a of the anchor bolt 9, the position of the hole 8a of the anchor ring 8 can be adjusted in the radial direction of the existing pipe 4. The fixing position in the longitudinal direction of the anchor ring 8 is also set to such a position at which, for example, as shown in FIG. 4, it does not contact the side plates 102 and 103 and the reinforcing plates 106 and 107 of the segment 1, e.g., at a position between the reinforcing plates 106 and 107.

Furthermore, because a rod 11b of the coupling member 11 is inserted through the elliptical hole 8a of the anchor ring 8, it is understood that the diameter in the short axis direction, and of course the diameter in the long axis direction, is greater than the diameter of the rod 11b.

In addition, the anchor rings 8 are fixed at all fixing positions before the assembly of the rehabilitating pipe; however, every time the rehabilitating pipe is assembled by a length corresponding to the interval of the successive fixing positions of the anchor rings 8 in the longitudinal direction, it is also acceptable to fix anchor rings 8 on the inner wall surface of the existing pipe 4 at positions corresponding to the segments 1 to be coupled next in the longitudinal direction, and then subsequently perform the next coupling of the segments in the longitudinal direction.

Figure 2:
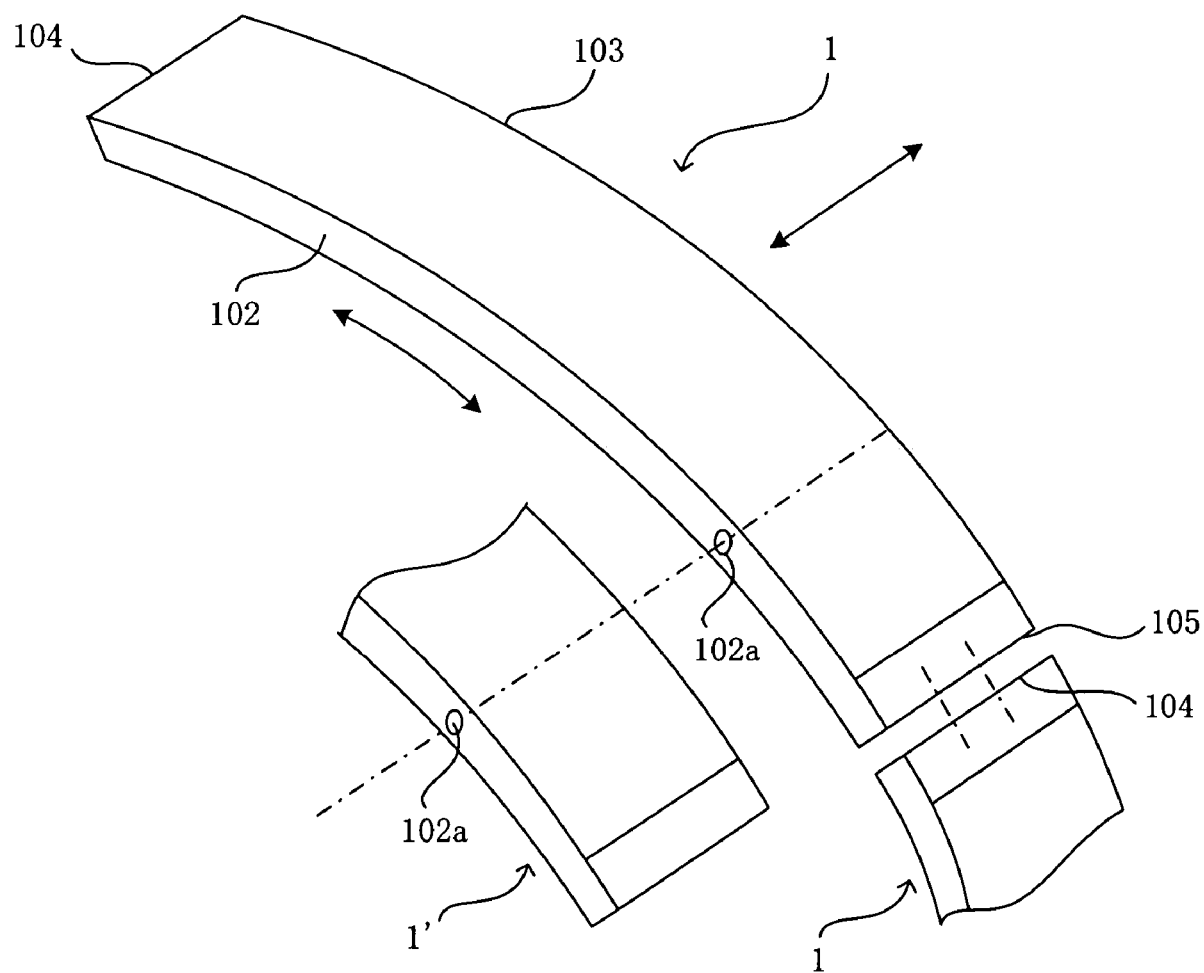
FIG. 2 is a perspective view showing how the segments are coupled in the circumferential direction and in the longitudinal direction.

After the anchor rings 8 have been fixed, the segments 1 are carried into the existing pipe, and successively coupled in the circumferential direction, as shown in FIG. 2. This coupling is performed, as shown in detail in FIG. 3, by positioning each segment 1 so that the inner plates 101 and the side plates 102 and 103 of the segments align mutually; tightly sealing the outer surfaces of the end plates 104 and 105 of the segments 1; inserting connecting members, such as bolts 6, into the through holes 104a and 105a from the opening 101a of the inner plate 101; screwing on nuts 7; and tightening both end plates 104 and 105.

Furthermore, recessed parts 104b and 104c are formed across the entire length of the end plate 104 in the longitudinal direction, and protruding parts 105b and 105c, which respectively interfit with those recessed parts, are formed across the entire length of the end plate 105 in the longitudinal direction, thereby facilitating the work of positioning and tightly sealing both segments during coupling. In addition, by coating the interfitted part with a sealing material (not shown) beforehand, the watertightness of the coupled parts can be enhanced. In addition, when the coupling is completed, a cover (not shown) and the like is used to tightly seal each opening 101a. At this time, the inner surface of the cover is made continuous with the inner surface of each inner plate, thus forming a uniform inner surface.

At the positions where the anchor rings 8 are fixed, they become a hindrance, so that the segments are successively coupled in units (unit coupling). At other positions the segments are coupled until they form a ring (ring coupling).

After the segments are coupled into a ring or after a prescribed number of segments are coupled in the circumferential direction, other segments 1' are coupled in the longitudinal direction to the already coupled segments, as shown in FIG. 2.

The coupling in the longitudinal direction is performed, as shown in FIG. 4, by using a rod shaped coupling member 11 made of metal and that integrally joins a rod 11b with one end thereof formed as a screw part 11a, and the other end as a nut part 11c. A screw hole 11d is formed in the nut part 11c to receive the screw part 11a of the rod of another coupling member.

In FIG. 4, the coupling member 11 on the right side is already joined to the nut part 11c of another coupling member, shown by the chain line, and fixed to the segment 1. To couple another segment 1' to this segment 1, both segments 1 and 1' are first positioned so that the inner surfaces of the inner plates 101 thereof align and form a uniform surface. The outer surfaces of the side plates 102 and 103 of both the segments are then brought into tightly contact with each other with the nut part 11c protruding from the side plate 102 of the segment 1 interfitted with a through hole 103a of the side plate 103 of the segment 1'.

A coupling member 11' is then inserted through from the through hole 102a of the side plate 102 of the segment 1', and the screw part 11a' thereof is screwed into the screw hole 11d of the nut part 11c of the coupling member 11. At this time, the screw part 11a' and a rod 11b' are inserted from the through hole 102a through the through hole 106a, two notched parts 107a, and the through hole 106a, and screwed in; however, as shown in the figure, the anchor ring 8 is fixed facing the insertion position, and the screw part 11a' and the rod 11b' are also inserted through the hole 8a if the position of the hole 8a is aligned with the insertion position.

Upon screwing the screw part 11a' into the screw hole 11d until a nut part 11c' of the coupling member 11' hits against the reinforcing plate 106 of the segment 1', the coupling member 11' clamps the segment 1' against the segment 1 to thereby couple both segments 1 and 1'. Because the coupling of every segment is performed using, for example, four coupling members per segment, both segments 1 and 1' are coupled rigidly in the longitudinal direction. The coupled segments 1 and 1' are supported by anchor rings 8 via the coupling member 11' inserted through the hole 8a of the anchor rings 8.

Furthermore, since a protruding line 102c and a recessed line 103c that interfits thereto are formed across the entire perimeter in the circumferential direction of each side plate, the work of positioning and tightly sealing both segments during coupling in the longitudinal direction is simplified, the same as coupling the circumferential direction; in addition, by coating the interfitting part with a sealing material (not shown) beforehand, the watertightness of the coupled parts can be enhanced.

In addition, when the segment 1 in FIG. 4 is the initial segment in the longitudinal direction, the coupling member as shown in the figure cannot be used, and therefore a fixing member having a structure the same as the nut part 11c that can fix the segment 1 by some means is used as the coupling member.

As described above, the rehabilitating pipe 3 can be assembled and laid by successively and mutually coupling segments 1 in the circumferential and longitudinal directions inside the existing pipe 4, as shown in FIG. 5. In this assembly, the coupling members are used to couple the segments in the longitudinal direction and inserted through the anchor rings, which are fixed at a plurality of positions at an appropriate interval on the inner wall surface of the existing pipe 4. This allows the assembled rehabilitating pipe 3 to be assuredly supported at a plurality of positions inside the existing pipe by the anchor rings 8 with the aid of the coupling member 11.

Furthermore, because the rehabilitating pipe 3 is tentatively positioned by the support of the anchor rings 8 and cannot necessarily be positioned accurately, the rehabilitating pipe 3 is also positioned, as needed, by the use of other means in parallel, such as inserting spacers (not shown) between the outer periphery of the rehabilitating pipe 3 and the inner wall surface of the existing pipe 4.

After completion of the pipe laying, the gap between the existing pipe 4 and each of the segments 1 of the rehabilitating pipe 3 is filled with the filler (not shown), and integrated with the existing pipe as a compound pipe. The rehabilitating pipe 3 is supported in the vertical direction by the anchor rings 8 at a plurality of positions, as mentioned above, so that it is possible to prevent deformation due to the self-weight of the rehabilitating pipe 3 and the weight of the filler, and also to prevent the floating up of the rehabilitating pipe 3 in the filler.

In FIG. 5 the coupled segments 1 are schematically depicted as a simple block shape, and only one reinforcing plate is shown for the segments 1 wherein an anchor ring 8 and coupling members 11 are illustrated and the positions of other anchor rings 8 and the insertion positions of other coupling members 11 are depicted by chain lines. Although all of the segments 1 in FIG. 5 are coupled with their end plates aligned in the longitudinal direction, they can also be coupled with the positions of the end plates offset. In addition, it is understood that the number of coupling members 11 inserted per segment 1 is not limited to four.

The above successively couples the segments at only one side of the existing pipe in the longitudinal direction (single sided coupling), but it is also possible to successively couple at both sides in the longitudinal direction (bilateral coupling). In this case, the pipe laying time can be reduced because the segments can be coupled from both sides.

According to the embodiments described above, the work of laying the rehabilitating pipe can be performed more simply and in a shorter period of time because the thickness, weight, and cost of the segments 1 are reduced, and because, just by fixing the anchor rings 8 in advance to the inner wall surface of the existing pipe 4, it is unnecessary to accessorily provide steel reinforcing rods for reinforcement, as is done conventionally, or to install supports to prevent deformation.

Furthermore, the embodiments explained above make the holes 8a elliptical in order to handle the offset in the insertion positions of the coupling members 11; however, if that offset can be decreased, it is also acceptable to make the holes 8a circular, and to make their radii close to the rods 11b of the coupling members 11. In addition, it is understood that the holes 8a can also be formed with other shapes in accordance with the cross sectional shape of the rod 11b.

What is claimed is:

1. A method of laying a rehabilitating pipe inside an existing pipe to rehabilitate the existing pipe, comprising the steps of:
    fixing a plurality of support members having ring portions to an inner wall surface of the existing pipe so that the ring portions of the respective support members extend from the inner wall surface of the existing pipe; and
    assembling the rehabilitating pipe inside of the existing pipe by mutually coupling segments of the rehabilitating pipe in a longitudinal direction of the existing pipe by inserting coupling members through connecting through-holes of the segments and through holes of the ring portions of the support members to thereby support the assembled rehabilitating pipe so that the rehabilitating pipe remains inside of the existing pipe after assembly to rehabilitate the existing pipe.

2. A method according to claim 1; wherein the support members are fixed to the inner wall surface of the existing pipe at a plurality of positions at predetermined intervals in longitudinal and circumferential directions of the existing pipe.

3. A method according to claim 1; wherein a position of the hole of the ring portion of each of the support members is adjustable in a radial direction of the existing pipe.

4. A method according to claim 1; wherein the hole of the ring portion of each of the support members is substantially elliptical in shape; and wherein each of the support members is fixed to the inner wall surface of the existing pipe so that a long axis direction of the ellipse formed by the hole of the ring portion follows the circumferential direction of the existing pipe.

5. A method according to claim 1; wherein the assembling step further comprises the step of mutually coupling the segments of the rehabilitating pipe in a circumferential direction of the existing pipe by aligning through-holes formed in connecting plates of each pair of adjacent segments and inserting connecting members through the aligned through-holes.

6. A method according to claim 1; wherein each of the coupling members is generally rod-shaped.

7. A method according to claim 1; wherein the fixing step comprises the steps of drilling holes in the inner wall surface of the existing pipe and driving tapered portions of the support members into the respective drilled holes to thereby fix the support members to the inner wall surface of the existing pipe while the ring portions of the support members extend from the inner wall surface of the existing pipe.

8. A method according to claim 1; wherein the step of assembling the rehabilitating pipe inside of the existing pipe comprises the step of assembling the rehabilitating pipe so that an outer circumferential surface of the rehabilitating pipe is spaced apart from the inner wall surface of the existing pipe with a gap disposed therebetween; and further comprising the step of disposing a filler material in the gap between the rehabilitating pipe and the existing pipe so that the rehabilitating pipe and the existing pipe are integrated as a compound pipe.

9. A method of laying a rehabilitating pipe inside an existing pipe to rehabilitate the existing pipe, comprising the steps of:
    providing a plurality of support members each having a closed loop portion and an anchor portion connected to the closed loop portion;
    integrally connecting the anchor portion of each of the support members into an inner wall surface of the existing pipe so that the closed loop portion extends from the inner wall surface of the existing pipe;
    positioning inside the existing pipe a plurality of rehabilitating pipe segments each having a plurality of first connecting holes and a plurality of second connecting holes;
    mutually coupling a first preselected number of the rehabilitating pipe segments in a circumferential direction of the existing pipe; and assembling the rehabilitating pipe inside of the existing pipe by mutually coupling a second preselected number of the rehabilitating pipe segments to the first preselected number of the rehabilitating pipe segments in a longitudinal direction of the existing pipe by inserting coupling members through the second connecting holes of the first and second preselected number of rehabilitating pipe segments and through the closed loop portions of the respective support members to thereby support the assembled rehabilitating pipe so that the rehabilitating pipe remains inside of the existing pipe after assembly to rehabilitate the existing pipe.

10. A method according to claim 9; wherein the step of mutually coupling the first preselected number of the rehabilitating pipe segments comprises the step of aligning the first connecting holes of each pair of adjacent ones of the first preselected number of the rehabilitating pipe segments and inserting connecting members through the aligned first connecting holes.

11. A method according to claim 9; wherein the anchor portions of the respective support members are integrally connected to the inner wall surface of the existing pipe at a plurality of positions at predetermined intervals in longitudinal and circumferential directions of the existing pipe.

12. A method according to claim 9; wherein a position of the closed loop portion of each of the support members is adjustable in a radial direction of the existing pipe.

13. A method according to claim 9; wherein the closed loop portion of each of the support members is generally elliptical-shaped.

14. A method according to claim 13; wherein the anchor portions of the respective support members are integrally connected to the inner wall surface of the existing pipe so that a long axis direction of the ellipse formed by the respective closed loop portion follows the circumferential direction of the existing pipe.

15. A method according to claim 9; wherein each of the coupling members is generally rod-shaped.

16. A method according to claim 9; wherein the integrally connecting step comprises the steps of drilling holes in the inner wall surface of the existing pipe and driving the anchor portions of the support members into the respective drilled holes to thereby fix the support members to the inner wall surface of the existing pipe while the respective closed loop portions extend from the inner wall surface of the existing pipe.

17. A method according to claim 9; wherein the step of assembling the rehabilitating pipe inside of the existing pipe comprises the step of assembling the rehabilitating pipe so that an outer circumferential surface of the rehabilitating pipe is spaced apart from the inner wall surface of the existing pipe with a gap disposed therebetween; and further comprising the step of disposing a filler material in the gap between the rehabilitating pipe and the existing pipe so that the rehabilitating pipe and the existing pipe are integrated as a compound pipe.

18. A method according to claim 9; wherein the closed loop portion of each of the support members is generally elliptical-shaped; and wherein the anchor portions of the respective support members are integrally connected to the inner wall surface of the existing pipe so that a long axis direction of the ellipse formed by the respective closed loop portion follows the circumferential direction of the existing pipe.

19. A method of laying a rehabilitating pipe inside an existing pipe to rehabilitate the existing pipe, comprising the steps of:

providing a plurality of support members each having a closed loop portion and an anchor portion connected to the closed loop portion;

integrally connecting the anchor portions of the respective support members into an inner wall surface of the existing pipe at a plurality of positions at predetermined intervals in longitudinal and circumferential directions of the existing pipe so that the respective closed loop portions extend from the inner wall surface of the existing pipe;

positioning inside the existing pipe a plurality of rehabilitating pipe segments each having a plurality of connecting holes; and assembling the rehabilitating pipe inside of the existing pipe by mutually coupling the rehabilitating pipe segments in a longitudinal direction of the existing pipe by inserting coupling members through the connecting holes of the rehabilitating pipe segments and through the closed loop portions of the respective support members to thereby support the assembled rehabilitating pipe so that the rehabilitating pipe remains inside of the existing pipe after assembly to rehabilitate the existing pipe.

20. A method according to claim 19; wherein a position of the closed loop portion of each of the support members is adjustable in a radial direction of the existing pipe.

* * * * *